United States Patent
Heft et al.

(10) Patent No.: US 8,843,292 B2
(45) Date of Patent: Sep. 23, 2014

(54) ADAPTIVE SPEED CONTROL DEVICE

(75) Inventors: Ron Heft, Farmington Hills, MI (US);
Hiroshi Tsuda, McLean, VA (US);
Hiroshi Kawazoe, Fujisawa (JP);
Masahide Nakamura, Yokohama (JP)

(73) Assignee: Nissan North America, Inc., Franklin, TN (US)

( * ) Notice: Subject to any disclaimer, the term of this patent is extended or adjusted under 35 U.S.C. 154(b) by 1114 days.

(21) Appl. No.: 12/389,867

(22) Filed: Feb. 20, 2009

(65) Prior Publication Data

US 2010/0217494 A1     Aug. 26, 2010

(51) Int. Cl.
*B60T 8/32*     (2006.01)
*B60T 7/00*     (2006.01)
*B60T 7/22*     (2006.01)

(52) U.S. Cl.
CPC ... *B60T 7/22* (2013.01); *B60T 8/32* (2013.01); *B60T 2201/02* (2013.01)
USPC .............................................. 701/93; 701/70

(58) Field of Classification Search
USPC .............................................. 701/70, 93, 96
See application file for complete search history.

(56) References Cited

U.S. PATENT DOCUMENTS

| | | | |
|---|---|---|---|
| 5,485,161 A * | 1/1996 | Vaughn | 342/357.31 |
| 6,161,072 A | 12/2000 | Clapper | |
| 6,246,948 B1 * | 6/2001 | Thakker | 701/93 |
| 6,374,173 B1 * | 4/2002 | Ehlbeck | 701/93 |
| 6,728,605 B2 * | 4/2004 | Lash et al. | 701/1 |
| 7,183,942 B2 * | 2/2007 | Rock et al. | 340/905 |
| 7,296,646 B2 | 11/2007 | Kawazoe et al. | |
| 7,400,963 B2 * | 7/2008 | Lee et al. | 701/93 |
| 7,426,432 B2 | 9/2008 | Kawazoe et al. | |
| 7,711,468 B1 * | 5/2010 | Levy | 701/70 |
| 7,983,836 B2 * | 7/2011 | Breed | 701/117 |
| 8,175,802 B2 * | 5/2012 | Forstall et al. | 701/424 |
| 8,509,971 B1 * | 8/2013 | Isailovski et al. | 701/20 |
| 2002/0173881 A1 * | 11/2002 | Lash et al. | 701/1 |
| 2004/0015275 A1 * | 1/2004 | Herzog et al. | 701/19 |
| 2005/0267658 A1 * | 12/2005 | Yuan et al. | 701/36 |
| 2006/0229792 A1 | 10/2006 | Kawazoe et al. | |
| 2006/0271265 A1 | 11/2006 | Kawazoe et al. | |
| 2007/0156321 A1 * | 7/2007 | Schad | 701/96 |
| 2007/0168125 A1 * | 7/2007 | Petrik | 701/213 |
| 2009/0157276 A1 * | 6/2009 | Kade | 701/96 |
| 2010/0161195 A1 * | 6/2010 | Shin | 701/93 |
| 2010/0198450 A1 * | 8/2010 | Shin | 701/29 |
| 2010/0204896 A1 * | 8/2010 | Biondo et al. | 701/93 |
| 2010/0211247 A1 * | 8/2010 | Sherony | 701/29 |

* cited by examiner

*Primary Examiner* — Anne Marie Boehler
*Assistant Examiner* — Maurice Williams
(74) *Attorney, Agent, or Firm* — Global IP Counselors, LLP

(57) ABSTRACT

An adaptive speed control device includes a posted speed change detecting section, a notification section, a set speed signal receiving section, and an adaptive speed control section. The posted speed change detecting section is configured to detect an upcoming change to a posted speed limit at. The notification section is configured to control a user interface device to notify a new posted speed limit at a prescribed notification timing before the vehicle reaches a transition point. The set speed signal receiving section is configured to accept a set speed signal from a user input device. The adaptive speed control section is configured to change a set speed of the vehicle according to the new posted speed limit and to automatically change a speed to the set speed upon receiving the set speed signal at or after a prescribed activation timing that occurs simultaneously with or after the prescribed notification timing.

22 Claims, 8 Drawing Sheets

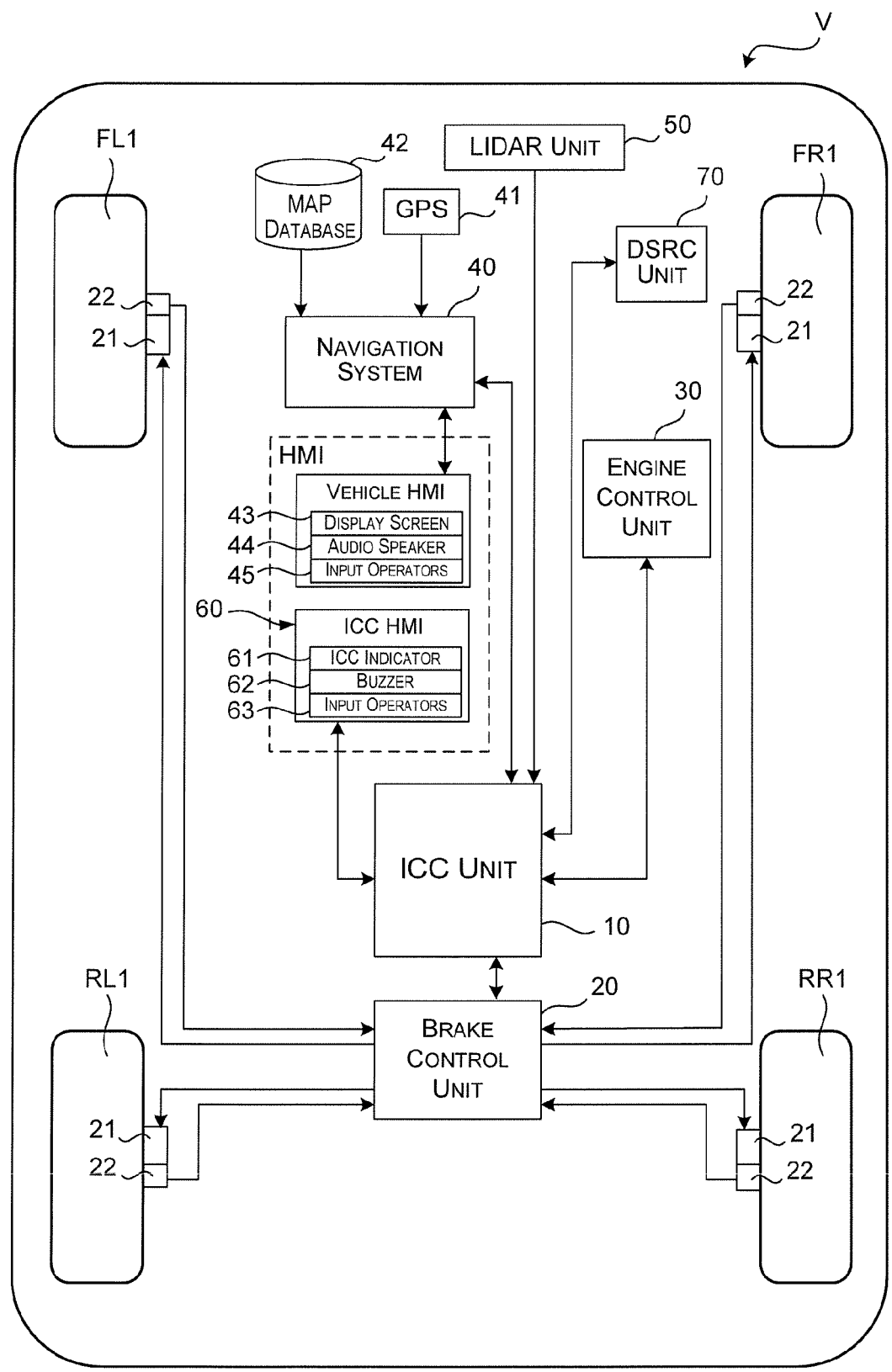
F I G. 1

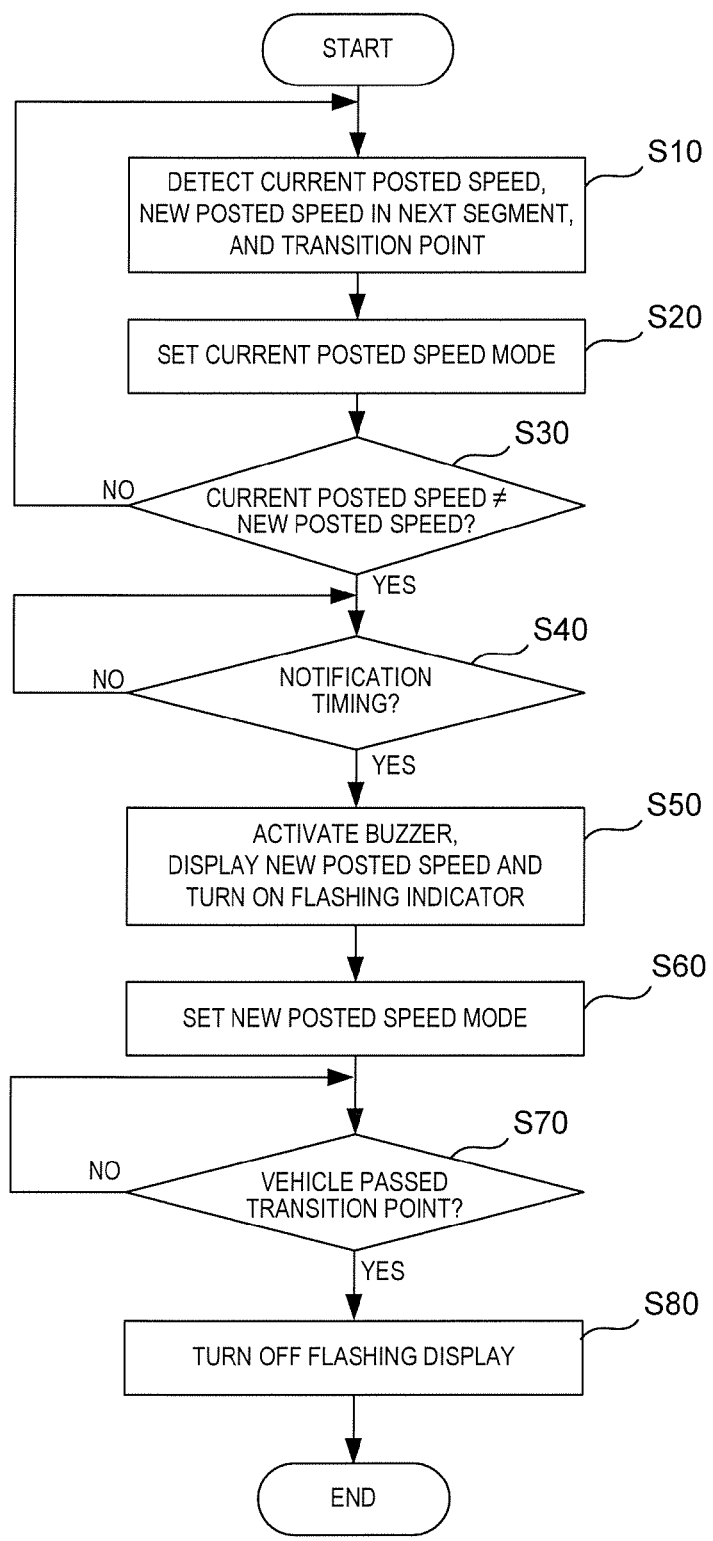
F I G. 3

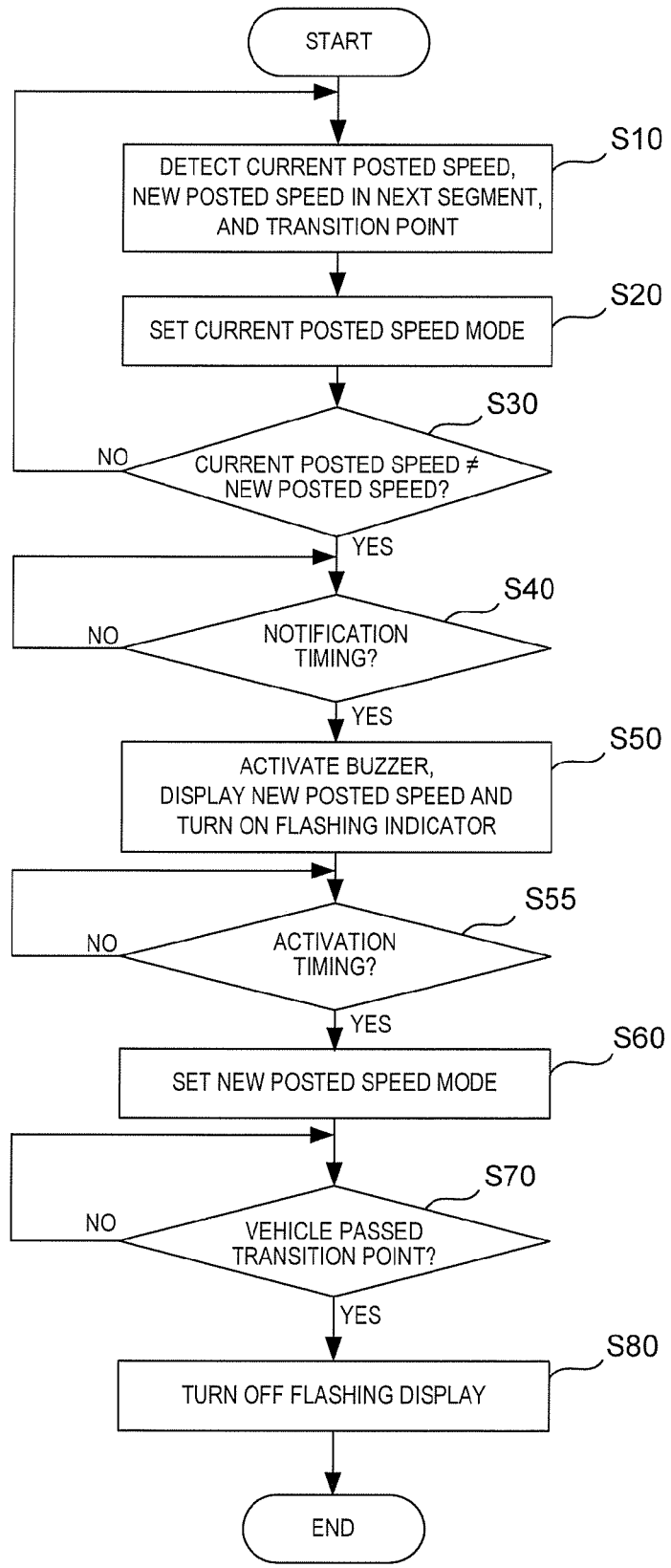
F I G. 8

ADAPTIVE SPEED CONTROL DEVICE

BACKGROUND OF THE INVENTION

1. Field of the Invention

The present invention generally relates to an adaptive speed control device. More specifically, the present invention relates to an adaptive speed control device that notifies a driver of an upcoming change to the posted speed limit along the vehicle's expected path, and automatically changes the vehicle's set speed according to a new posted speed limit upon receiving a set speed signal inputted by the driver.

2. Background Information

In recent years, some vehicles are equipped with a speed control system such as a cruise control system and an adaptive cruise control system (ACC). The adaptive cruise control system is similar to the conventional cruise control system in that it maintains the vehicle's pre-set speed. However, unlike the conventional cruise control system, the adaptive cruise control system can automatically adjust the vehicle speed in order to maintain a proper distance between the host vehicle and the preceding vehicle in the same lane.

Moreover, an improved adaptive speed control system is under development, which integrates route information to adjust the vehicle's cruising speed to match actual road conditions. For example, U.S. Pat. No. 7,426,432 proposes a cooperative speed control system that automatically determines a new vehicle set speed based on local required speed information and automatically changes the vehicle speed to a new set vehicle speed without driver intervention.

In view of the above, it will be apparent to those skilled in the art from this disclosure that there exists a need for an improved adaptive speed control device. This invention addresses this need in the art as well as other needs, which will become apparent to those skilled in the art from this disclosure.

SUMMARY OF THE INVENTION

It has been discovered that it is beneficial to notify the driver of an upcoming change to the posted speed limit and to provide the user with an option to select the automatic control of the vehicle speed in response to the new posted speed limit.

Therefore, one object of the invention is to provide an improved method for notifying the driver of an upcoming change to the posted speed limit along the vehicle's expected path, and automatically changing the vehicle's set speed according to a new posted speed limit upon receiving a set speed signal inputted by the driver.

In order to achieve the above object and other objects of the present invention, an adaptive speed control device is installed in a host vehicle. The adaptive speed control device includes a posted speed change detecting section, a notification section, a set speed signal receiving section, and an adaptive speed control section. The posted speed change detecting section is configured to detect an upcoming change from a current posted speed limit to a new posted speed limit at a transition point along a host vehicle's expected path. The notification section is configured to control a user interface device installed in the host vehicle to notify a user of the new posted speed limit at a prescribed notification timing before the host vehicle reaches the transition point. The set speed signal receiving section is configured to accept a set speed signal from a user input device installed in the host vehicle. The adaptive speed control section is configured to change a set speed of the host vehicle in accordance with the new posted speed limit and to control a vehicle speed controller of the host vehicle to automatically change a speed of the host vehicle to the set speed upon the set speed signal receiving section receiving the set speed signal at or after a prescribed activation timing that occurs simultaneously with or after the prescribed notification timing.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 1 is a schematic structural diagram of a host vehicle equipped with an adaptive speed control device in accordance with a first embodiment of the present invention;

FIG. 3 is a flowchart illustrating a main routine for the adaptive speed control processing executed by an ICC unit in accordance the first embodiment;

FIG. 8 is a flowchart illustrating a main routine for the adaptive speed control processing executed by the ICC unit in accordance with a second embodiment of the present invention.

DETAILED DESCRIPTION OF THE PREFERRED EMBODIMENTS

Figure 2:
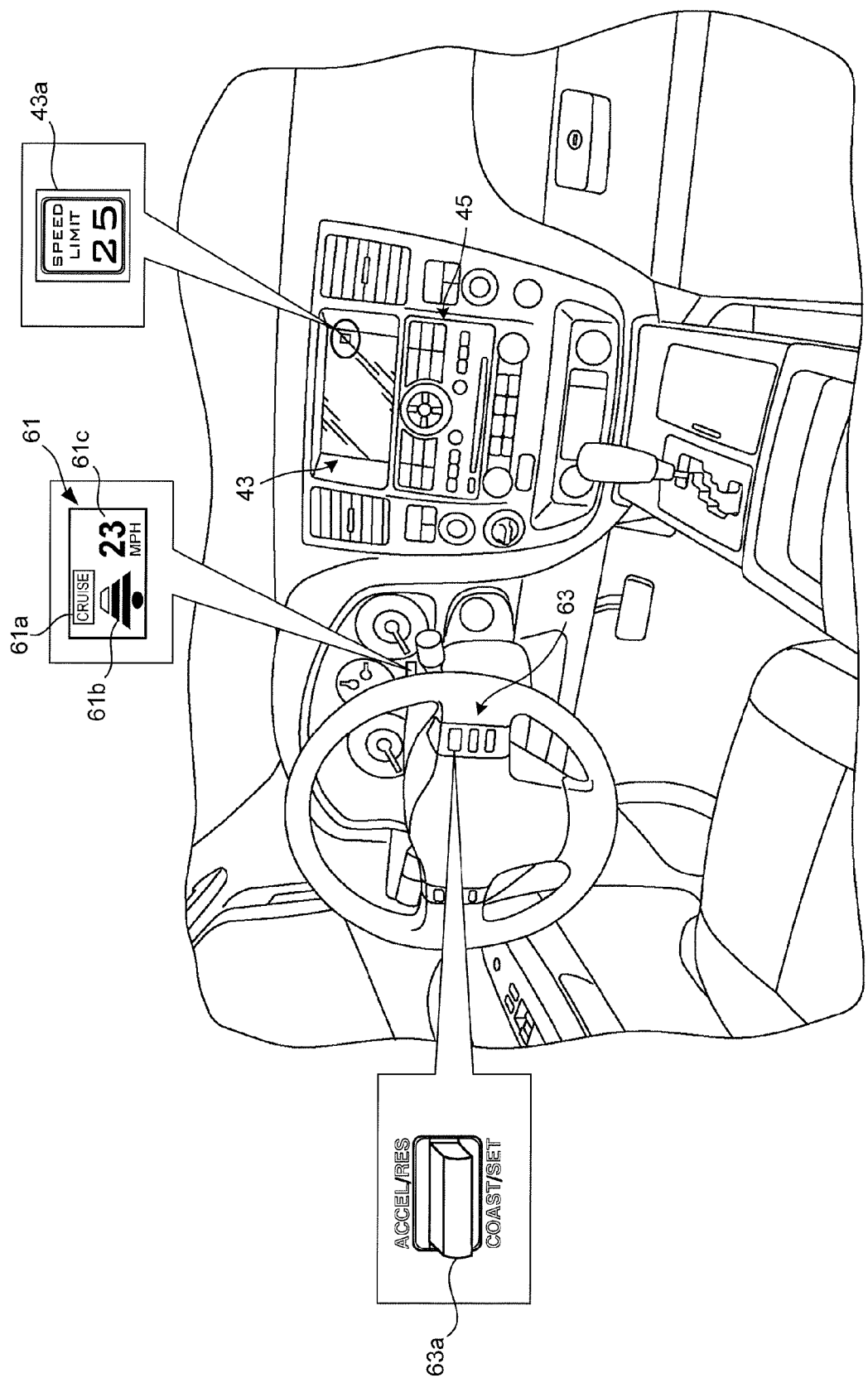
FIG. 2 is a diagrammatic view of an interior of the host vehicle equipped with the adaptive speed control device in accordance with the first embodiment.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIG. 1, a host vehicle V equipped with an ICC (Intelligent Cruise Control) unit 10 (adaptive speed control device) is illustrated in accordance with the first embodiment of the present invention. The ICC unit 10 according to the first embodiment is configured to notify a driver of the host vehicle V of an upcoming change to the posted speed limit along the host vehicle's expected path at a prescribed timing, and to automatically change the host vehicle's set speed according to a new posted speed limit upon receiving a set speed signal inputted by the driver at or after the prescribed timing.

As shown in FIG. 1, the ICC unit 10 is operatively coupled to a brake control unit 20, an engine control unit 30, an on-board navigation system 40, a LIDAR (Light Detection and Ranging) unit 50, and an ICC human-machine interface 60 via the Controller Area Network (CAN). When the host vehicle V is provided with a DSRC (Dedicated Short-Range Communication) unit 70, the ICC unit is preferably coupled to the DSRC unit 70.

The brake control unit 20 is operatively coupled to a brake actuator 21 of each of a front left wheel FL1, a front right wheel FR1, a rear left wheel RL1 and a rear right wheel RR1. The brake control unit 20 is configured to control hydraulic pressure of the brake actuators 21. Also, the brake control unit 20 is operatively coupled to a wheel speed sensor 22 provided in each of the front left wheel FL1, the front right wheel FR1, the rear left wheel RL1 and the rear right wheel RR1 to receive a wheel speed information from the wheel speed sensors 22. The brake control unit 20 is configured to determine driving speed of the host vehicle V based on the wheel speed information received from the wheel speed sensors 22, and to decelerate the host vehicle V by controlling the brake actuators 21 when requested by the ICC unit 10. The brake control unit 20 is also configured to decelerate the host vehicle V by controlling the brake actuators 21 according to a depression amount of a brake pedal (not shown) when the driver steps on the brake pedal.

The engine control unit 30 is operatively coupled to an internal combustion engine (not shown) of the host vehicle V to control output of the engine. More specifically, the engine control unit 30 is configured to control a throttle opening degree of the engine to adjust driving speed of the host vehicle V when requested by the ICC unit 10. The engine control unit 30 is also configured to control the throttle opening degree of the engine according to a depression amount of an accelerator pedal (not shown) when the driver steps on the accelerator pedal. The brake control unit 20 and the engine control unit 30 preferably constitute the vehicle speed controller of the host vehicle V according to the illustrated embodiments.

The navigation system 40 is a conventional navigation system that is configured and arranged to receive global positioning information via a global positioning system (GPS) 41 in a conventional manner, and to provide driving directions to other locations along roads using a map database 42. Basically, the navigation system 40 is coupled to a vehicle human-machine interface having a color display screen 43, an audio speaker 44 and input operators 45. The display screen 43 can be arranged as a conventional touch-screen that also serves as one of the user input devices. The navigation system 40 can have its own controller with microprocessor and storage, or the processing for the navigation system 40 can be executed by the ICC unit 10. In either case, the signals transmitted from the global positioning satellites are utilized to guide the host vehicle V in a conventional manner.

The GPS 41 is a conventional global positioning system that is configured and arranged to receive global positioning information of the host vehicle V in a conventional manner. Basically, the GPS 41 includes a receiver for receiving a signal from the global positioning satellite via a GPS antenna. The signal transmitted from the global positioning satellite is received at regular intervals (e.g. one second) to detect the present position of the host vehicle V. The GPS 41 preferably has an accuracy of indicating the actual vehicle position within a few meters or less. This data (present position of the host vehicle V) is fed to the ICC unit 10 via the navigation system 40 for processing.

The map database 42 is configured to store road map data as well as other data that can be associated with the road map data such as local posted speed data, various landmark data, fueling station locations, restaurants, etc. For example, the map database 42 preferably stores digital map data for Advance Driver Assistance Systems (ADAS). Such digital map data preferably contains various ADAS attributes such as road type information (e.g., highway, highway ramp, local road, unrestricted access, restricted access, bridge, tunnel, roundabout, etc.), road condition information (e.g., school zone, work zone, etc.), posted speed limit information, traffic sign information, lane information, traffic light information, etc., that can be used in various ADAS applications. The posted speed limit information stored in the digital map data includes posted speed limits for roadway segments and transition points of the posted speed limits. As used herein, the term "posted speed limit" or "posted speed" can include different types of vehicle speed requirement assigned to roadway segments such as a maximum speed limit, a minimum speed limit, a recommended speed, etc.

The map database 42 preferably includes a large-capacity storage medium such as a CD-ROM (Compact Disk-Read Only Memory) or IC (Integrated Circuit) card to store the digital map data. The map database 42 is configured to perform a read-out operation of reading out data held in the large-capacity storage medium in response to an instruction from the ICC unit 10 and/or the navigation system 40. The map database 42 is used by the ICC unit 10 to acquire the necessary map information as needed and/or desired for use in detecting the local posted speed data. The map database 42 is also used by the navigation system 40 to acquire the map information used for route guiding, map display, and direction guide information display. Preferably, the map information of this embodiment includes at least information necessary for offering of the map information and route guiding as performed by a general navigation device and necessary for performing the adaptive speed control by the ICC unit 10. The map information also includes at least road links indicating connecting states of nodes, locations of branch points (road nodes), names of roads branching from the branch points, and place names of the branch destinations, and has such a data structure that, by specifying a location of interest, information on the corresponding road and place name can be read. The map information of the map database 42 stores road information for each roadway segment or node.

In the first embodiment, the navigation system 40 is preferably configured to detect a current posted speed limit of the roadway on which the host vehicle V is traveling by referring the map database 42. Then, the navigation system 40 is preferably configured to display the current posted speed limit in a speed limit display region 43a on the display screen 43 as shown in FIG. 2 along with the map display. Therefore, the driver can easily recognize the posted speed of the current roadway by looking at the speed limit display region 43a of the display screen 43.

The LIDAR unit 50 is attached to a front end of the host vehicle V. The LIDAR unit 50 is configured to measure properties of scattered light to determine a distance, a speed, and/or other information of a preceding vehicle traveling in the same lane as the host vehicle V.

The ICC human-machine interface 60 is configured and arranged to enable interaction between the driver and the ICC unit 10 by receiving the user input to manipulate the system and outputting information to indicate the effects of the driver's manipulation. The ICC human-machine interface 60 preferably includes an ICC indicator 61, a buzzer 62 or an audio output section, and a plurality of input operators 63 including various control switches and buttons.

The ICC indicator 61 is preferably disposed in a position that is easily visible to the driver while the driver is driving the host vehicle V. For example, as shown in FIG. 2, the ICC indicator 61 can be disposed in an instrument cluster adjacent to the speedometer or the like. The ICC indicator 61 is configured to display operating state/conditions of the cruise control system. For example, as shown in FIG. 2, the ICC indicator 61 can include a cruise indicator region 61a for indicating ON/OFF state of the cruise control, a vehicle-to-vehicle set distance indicator region 61b for indicating a user selected vehicle-to-vehicle distance, a set speed indicator region 61c for indicating a user set cruising speed. Of course, it will be apparent to those skilled in the art from this disclosure that the information displayed in the ICC indicator 61 and its arrangement are not limited to those described above.

The input operators 63 of the ICC human-machine interface 60 are configured and arranged to receive various user inputs relating to operation of the cruise control. As shown in FIG. 2, the input operators 63 are preferably disposed on a steering wheel of the host vehicle V at positions easily reached by the driver's thumb when the driver holds the steering wheel. The input operators 63 preferably include a one-touch button 63a (user input device) used for activating the adaptive speed control according to the first embodiment. When the driver operates the one-touch button 63a by simply holding it up or down, the one-touch button 63a is configured to send a user input signal to the ICC unit 10. The one-touch button 63a can also be used for setting the cruising speed, accelerating or decelerating the vehicle speed, and/or resuming the previously set cruising speed. The input operators 63 of the ICC human-machine interface 60 can also include a cancel button, a cruise control ON/OFF button, a distance set button, etc. The vehicle human-machine interface and the ICC human-machine interface preferably constitute the user interface device of the host vehicle V according to the illustrated embodiments.

The DSRC unit 70 is configured and arranged to communicate with roadside DSRC equipped infrastructures and other DSRC equipped vehicles within the two-way wireless communications network for broadcasting and receiving signals.

When the driver of the host vehicle V activates the cruise control system by operating the cruise control ON/OFF button of the input operators 63, the ICC unit 10 begins to control speed of the host vehicle V according to the prescribed conditions. For example, the ICC unit 10 can be configured to perform two different modes of cruise control: the adaptive cruise control mode and the fixed speed cruise control mode. In the adaptive cruise control mode, the ICC unit 10 is configured to control the vehicle speed to adapt the host vehicle's speed to the traffic environment. More specifically, the ICC unit 10 is configured to process the information received from the LIDAR unit 50 to determine whether a preceding vehicle exist in front of the host vehicle V. The ICC unit 10 is then configured to control the set speed of the host vehicle V to adjust the clearance, or time gap, between the host vehicle V and the preceding vehicle by outputting signals to the brake control unit 20 and the engine control unit 30. The driver of the host vehicle V can set the desired cruising speed, the desired vehicle-to-vehicle distance (e.g., long, medium or short) for the adaptive speed control by using the input operators 63. In the fixed speed cruise control mode, the ICC unit 10 is configured to control the host vehicle V to maintain the set speed inputted by the driver using the input operators 63. The fixed speed cruise control and the adaptive speed control are conventional features that are well known in the art. Since the fixed speed cruise control and the adaptive speed control are well known in the art, these controls will not be discussed or illustrated in detail herein. Rather, it will be apparent to those skilled in the art from this disclosure that the components can be any type of structure and/or programming that can be used to carry out the first embodiment.

In the first embodiment, the ICC unit 10 is configured to perform an adaptive speed control that integrates the local posted speed limit information obtained from the map database 42 in the adaptive cruise control. More specifically, the ICC unit 10 is configured to detect an upcoming change of the posted speed limit, to notify the driver of the upcoming change, and to automatically control the vehicle speed upon receiving driver's instruction.

The ICC unit 10 preferably includes a microcomputer with an adaptive speed control program that controls the vehicle speed of the host vehicle V as discussed below. The ICC unit 10 can also include other conventional components such as an input interface circuit, an output interface circuit, and storage devices such as a ROM (Read Only Memory) device and a RAM (Random Access Memory) device. The microcomputer of the ICC unit 10 is programmed to control the various components operatively coupled to the ICC unit 10. The memory circuit stores processing results and control programs that are run by the processor circuit. The ICC unit 10 is operatively coupled to the brake control unit 20, the engine control unit 30, the navigation system 40, the LIDAR unit 50, the ICC human-machine interface 60 and other components in a conventional manner. The internal RAM of the ICC unit 10 stores statuses of operational flags and various control data. The ICC unit 10 is capable of selectively controlling any of the components of the control system in accordance with the control program. It will be apparent to those skilled in the art from this disclosure that the precise structure and algorithms for the ICC unit 10 can be any combination of hardware and software that will carry out the adaptive speed control according to the illustrated embodiments as described above.

Referring now to a flowchart shown in FIG. 3, a main routine for the adaptive speed control executed by the ICC unit 10 will be explained in accordance with the first embodiment. The flowchart of FIG. 3 describes one example of the main routine algorithm for the adaptive speed control process. The control process described in the flowchart of FIG. 3 is preferably executed repeatedly at a prescribed interval by the ICC unit 10 while the adaptive cruise control mode is activated. In other words, in the preferred embodiment, the ICC unit 10 is configured to automatically initiate the adaptive speed control shown in FIG. 3 when the user activates the adaptive cruise control mode by operating the cruise control ON/OFF button of the input operators 63. Alternatively, an activation button or the like may be provided to turn on/off the adaptive speed control shown in FIG. 3 so that the ICC unit 10 initiates the adaptive speed control after the activation button or the like is operated by the user.

In step S10 of FIG. 3, the ICC unit 10 is configured to detect a current posted speed limit assigned to a roadway segment on which the host vehicle V is currently traveling, a new posted speed limit assigned to a next roadway segment that exists on the host vehicle's expected path, and a transition point at which the posted speed limit changes from the current posted speed limit and the new posted speed limit. The transition point may be set to, for example, a location where the speed limit sign for the new posted speed limit is placed along the roadway. The ICC unit 10 is preferably configured to retrieve the information regarding the current posted speed limit, the new posted speed limit, and the transition point from the map database 42 through the navigation system 40. Of course, it will be apparent to those skilled in the art from this disclosure that alternative methods of determining required local speeds and transition points are also applicable. For example, the information regarding the current posted speed limit, the new posted speed limit, and the transition point can be determined based on a received radio signal from an infrastructure communication device through the DSRC unit 70. The infrastructure communication device would be used by the government/private entity responsible for roadways to distribute the required speed. Also, advanced image recognition programming can be used to analyze an image of a speed limit sign to determine the required speed. Furthermore, bar codes may be placed along a roadway that may be scanned utilizing a laser sensor mounted on the hot vehicle V so that the local required speed may be determined and utilized in the adaptive speed control according to the first embodiment. In yet other scenarios, information relating to the required speed may be obtained from other vehicles through the DSRC unit 70 or the like. Thus, any device, method or apparatus that can be used to convey the information regarding the current posted speed limit, the new posted speed limit, and the transition point to the ICC unit 10 may be used to practice the first embodiment.

As mentioned above, the navigation system 40 is preferably configured to display the current posted speed limit in the speed limit display region 43a (FIG. 2) of the display screen 43 in the first embodiment.

In step S20, the ICC unit 10 is configured to set a current posted speed mode in which operation of the one-touch button 63a by the driver results in the vehicle speed being automatically changed to the current posted speed detected in step S10. In other words, when the current posted speed mode is set, the ICC unit 10 responds to operation of the one-touch button 63a by changing the set speed of the host vehicle V to the current posted speed limit. If a new posted speed mode has been set by the ICC unit 10 in a previous control cycle, the control process in step S20 overrides it with the current posted speed mode. Then, the process proceeds to step S30.

In step S30, the ICC unit 10 is configured to detect an upcoming change to the posted speed limit. More specifically, the ICC unit 10 is configured to determine whether the current posted speed limit detected in step S10 is different from the new posted speed limit also detected in step S10. If the current posted speed limit is the same as the new posted speed limit, then the process returns to step S10. On the other hand, if the ICC unit 10 determines that the new posted speed limit is different from the current posted speed limit in step S30, then the process proceeds to step S40. The control processing in step S30 preferably corresponds to the posted speed change detecting section of the adaptive speed control device according to the illustrated embodiments.

In step S40, the ICC unit 10 is configured to determine whether it reached a prescribed notification timing. In the first embodiment, the prescribed notification timing is preferably defined as a prescribed period (e.g., 7 to 9 seconds) before the host vehicle V reaches the transition point from the current posted speed limit to the new posted speed limit. In this embodiment, the transition point is set to a location where a speed sign for the new posted speed limit is placed along the roadway. In order to determine whether it reached the notification timing in step S40, the ICC unit 10 is preferably configured to calculate an estimated time of arrival at the transition point based on the current vehicle speed and current acceleration/deceleration rate. Then, if the estimated time of arrival is equal to or less than the prescribed period, then the ICC unit 10 determines that it reached the prescribed notification timing, and the process proceeds to step S50. The ICC unit 10 is configured to repeat the processing in step S40 at a prescribed interval until the estimated time of arrival becomes equal to or less than the prescribed period. It will be apparent to those skilled in the art from this disclosure that a method for determining whether it reached the notification timing is not limited to the method described above. Any suitable method can be utilized as long as arrival of notification timing (e.g., the prescribed period before the host vehicle V reaches the transition point) can be detected by the ICC unit 10. For example, this determination may be made by using the GPS information and the map data, the LIDAR information, the DSRC information, etc.

In step S50, the ICC unit 10 is configured to notify the driver of the upcoming change to the posted speed limit using one or more of audible and visual output devices (e.g., activating the buzzer 62, playing a sound through the speaker 44, displaying flashing digits or a graphic on the ICC indicator 61 and/or the display screen 43, and the like). For example, in this embodiment, the ICC unit 10 is configured to activate the buzzer 62 to provide an audio output indicative of the upcoming change to the posted speed limit. Moreover, the ICC unit 10 is configured to control the ICC indicator 61 to display flashing digits corresponding to the new posted speed limit to provide a visual output indicative of the upcoming change to the posted speed limit. The flashing display of the ICC indicator 61 is preferably maintained until the host vehicle V reaches the transition point. The control processing in step S50 preferably corresponds to the notification section of the adaptive speed control device according to the illustrated embodiments. Then, the process proceeds to step S60.

In step S60, the ICC unit 10 is configured to set a new posted speed mode in which operation of the one-touch button 63a by the driver results in the vehicle speed being automatically changed to the new posted speed detected in step S10. In other words, when the new posted speed mode is set, the ICC unit 10 responds to operation of the one-touch button 63a by changing the set speed of the host vehicle V to the new posted speed limit. The control processing in step S60 overrides the current posted speed mode set in step S20. Then, the process proceeds to step S70.

In step S70, the ICC unit 10 is configured to determine whether the host vehicle V passed the transition point. For example, the ICC unit 10 can determine whether the host vehicle V passed the transition point by calculating the estimated time of arrival to the transition point, using the GPS information, using the LIDAR information, and the like. If the ICC unit 10 determines the host vehicle V has not passed the transition point yet in step S70, then the ICC unit 10 is configured to repeat the processing in step S70 at a prescribed interval until the host vehicle V passed the transition point. If the ICC unit 10 determines the host vehicle V passed the transition point in step S70, then the ICC unit 10 proceeds to step S80.

In step S80, the ICC unit 10 is configured to turn off the flashing display in the ICC indicator 61, then the ICC unit 10 ends this control cycle.

Figure 4:
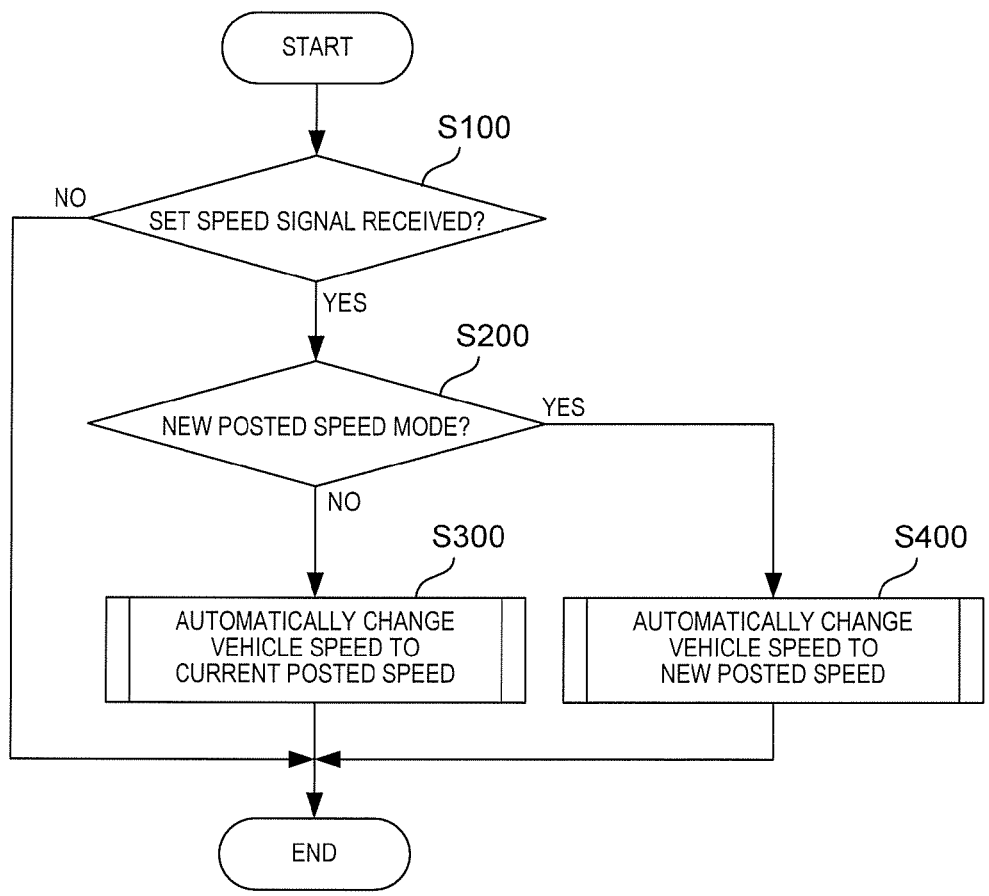
FIG. 4 is a flowchart illustrating a subroutine concurrently executed with the main routine shown in FIG. 3 by the ICC unit in accordance with the first embodiment.

Referring now to a flowchart shown in FIG. 4, a subroutine for the adaptive speed control executed by the ICC unit 10 will be explained in accordance with the first embodiment. The subroutine illustrated in FIG. 4 is concurrently executed with the main routine shown in FIG. 3 at a prescribed interval while the adaptive cruise control mode is activated or when the activation button or the like for activating the adaptive speed control shown in FIG. 3 is operated by the user. The flowchart of FIG. 4 describes one example of the subroutine algorithm for the adaptive speed control process.

In step S100, the ICC unit 10 is configured to determine whether a set speed signal has been received from the one-touch button 63*a*. More specifically, when the driver activates the one-touch button 63*a* (e.g., by holding the one-touch button 63*a* down for a prescribed period of time) the one-touch button 63*a* sends a prescribed set speed signal to the ICC unit 10. Input of the set speed signal indicates the driver's intention to accept the automatic speed control to change the set speed currently selected by the driver to a speed that matches the current posted speed limit or the new posted speed limit. If the one-touch button 63*a* was operated and the set speed signal was received by the ICC unit 10 in step S100, then the process proceeds to step S200. If the ICC unit 10 has not received the set speed signal in step S100, then the ICC unit 10 ends this control cycle. The control processing in step S100 preferably corresponds to the set speed signal receiving section of the adaptive speed control device according to the illustrated embodiments.

In step S200, the ICC unit is configured to determine whether the new posted speed mode has been set (step S60 in FIG. 3). When the new posted speed mode has been set, operation of the one-touch button 63*a* causes the vehicle speed to be automatically adjusted to the new posted speed limit. On the other hand, if the new posted speed mode has not been set (i.e., when the current posted speed mode has been set), operation of the one-touch button 63*a* causes the vehicle speed to be automatically adjusted to the current posted speed limit. Therefore, if the ICC unit 10 determines that the new posted speed mode has not been set in step S200, then the process proceeds to step S300. If the ICC unit 10 determines that the new posted speed mode has been set in step S200, then the process proceeds to step S400. The control processing in steps S300 and S400 preferably correspond to the adaptive speed control section of the adaptive speed control device according to the illustrated embodiments.

In step S300, the ICC unit 10 is configured to perform the adaptive speed control to automatically change the speed of the host vehicle V to a speed that matches the current posted speed limit detected in step S10 of FIG. 3. More specifically, the ICC unit 10 is configured to control the brake control unit 20 and the engine control unit 30 so that the host vehicle V accelerates or decelerates to the current posted speed without driver intervention.

Figure 5:
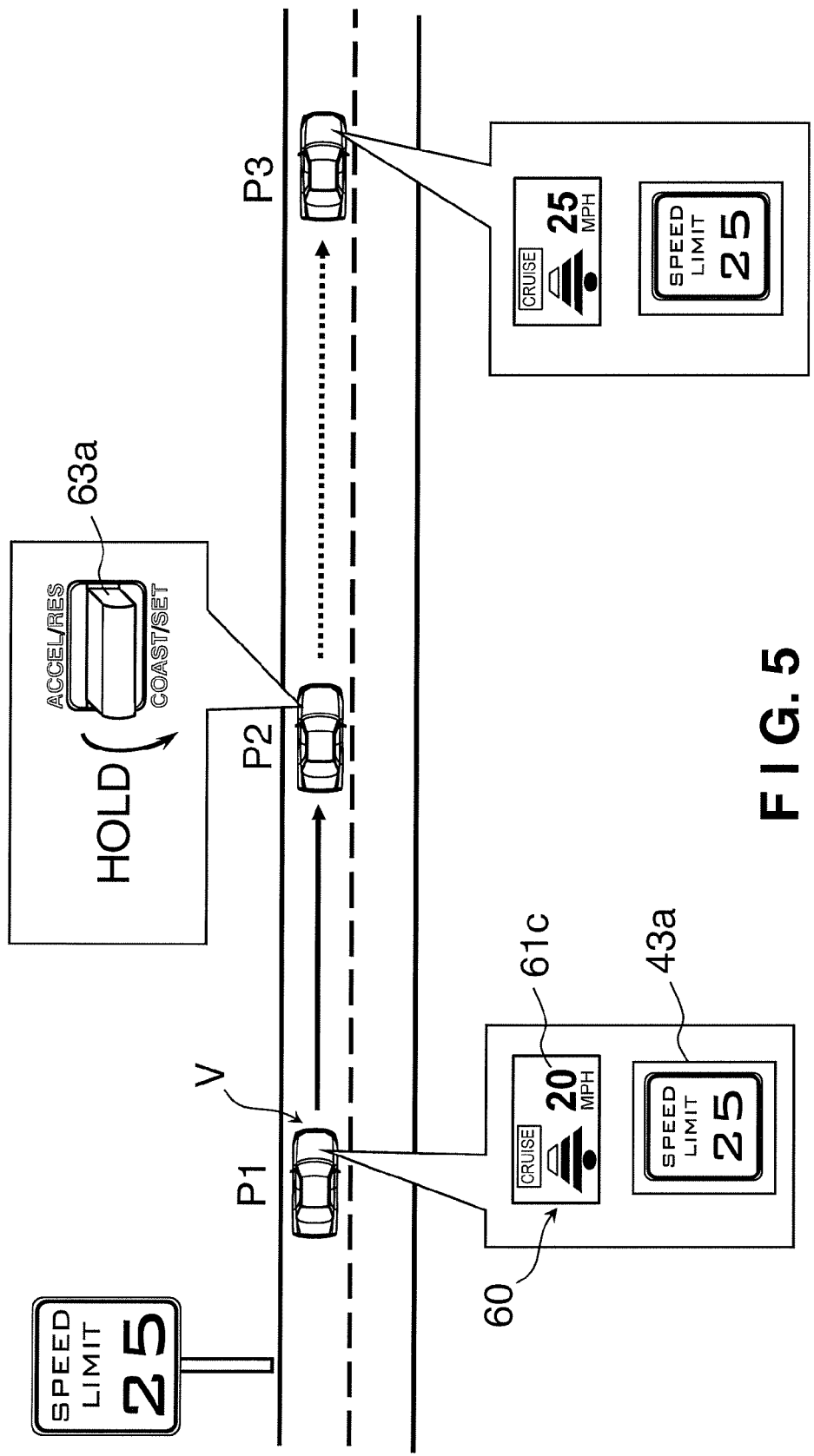
FIG. 5 is a schematic top plan (bird's eye) view of the host vehicle traveling on a roadway depicting changes to indicator displays upon operation of a one-touch button in accordance the first embodiment.

FIG. 5 illustrates one example of the adaptive speed control executed by the ICC unit 10 in step S300. In this example, the host vehicle V travels along a roadway for which the posted speed limit is set to 25 mph. In FIG. 5, assume the driver has activated the adaptive speed control mode and set the desired cruising speed to 20 mph by operating the input operators 63 before the host vehicle V reaches the point P1. In such a situation, the speed limit display region 43*a* on the display screen 43 shows the current speed limit of 25 mph while the set speed indicator region 61*c* of the ICC indicator 61 shows the set speed of 20 mph previously selected by the driver. When the driver operates the one-touch button 63*a* in point P2, the set speed signal is sent to the ICC unit 10. Therefore, the ICC unit 10 is configured to control the engine control unit 30 to accelerate the host vehicle V so that the speed of the host vehicle reaches the current posted speed limit, i.e., 25 mph. Once the driver operates the one-touch button 63*a* in point P2, or once the speed of the host vehicle V reaches the current posted speed limit in point P3, the display in the set speed indicator region 61*c* of the ICC indicator 61 is changed to indicate the current posted speed, i.e., 25 mph. Accordingly, with the adaptive speed control executed by the ICC unit 10 in step S300 of FIG. 4, the speed of the host vehicle V is automatically adjusted to the current speed limit simply by pressing the one-touch button 63*a*.

Referring back to FIG. 4, in step S400, the ICC unit 10 is configured to perform the adaptive speed control to automatically change the speed of the host vehicle V to a speed that matches the new posted speed limit detected in step S10. More specifically, the ICC unit 10 is configured to control the brake control unit 20 and the engine control unit 30 so that the host vehicle V accelerates or decelerates to the new posted speed without driver intervention.

Figure 6:
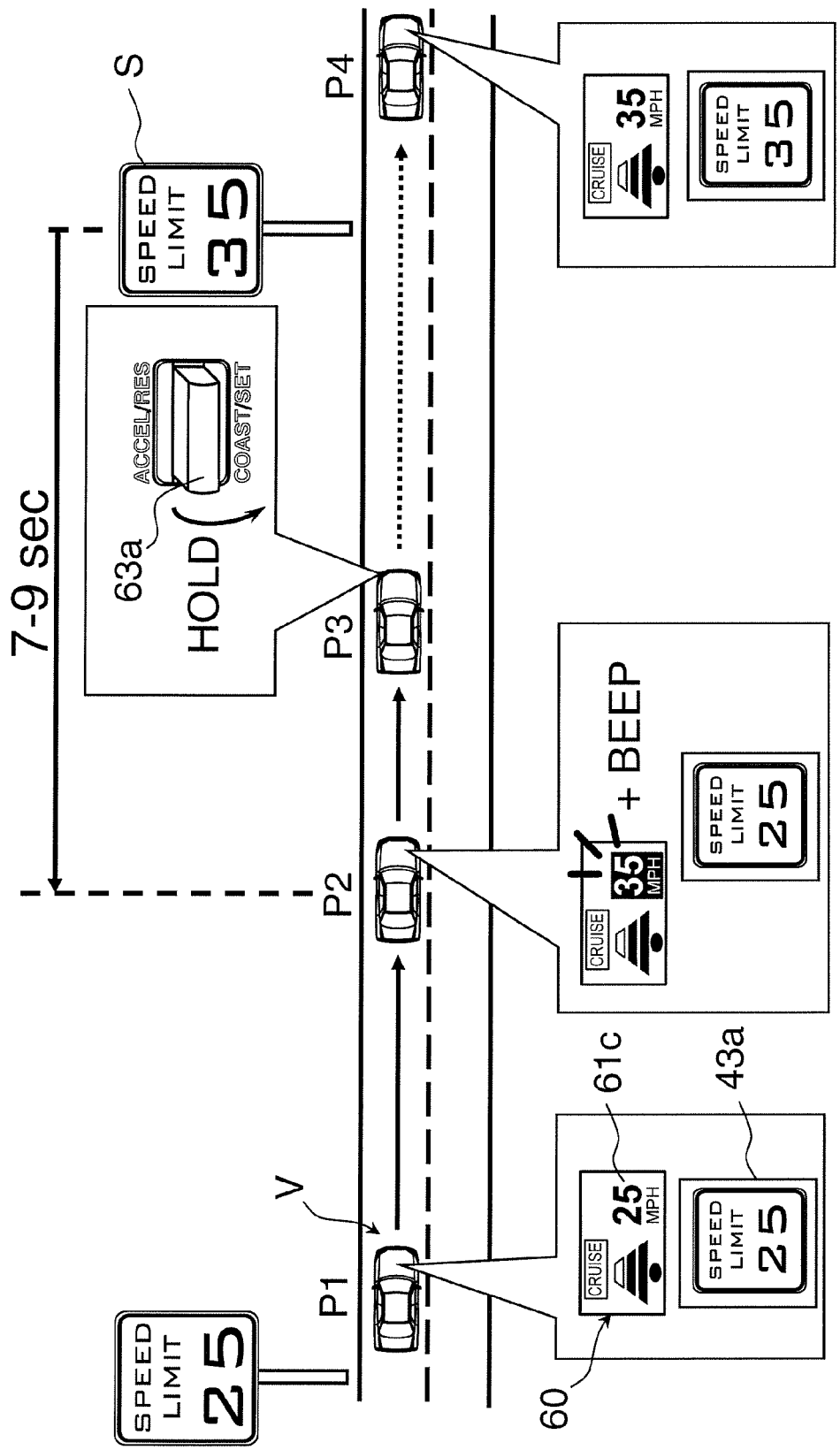
FIG. 6 is a schematic top plan (bird's eye) view of the host vehicle traveling on a roadway depicting changes to the indicator displays upon operation of the one-touch button when a posted speed limit changes along the roadway in accordance the first embodiment.

FIG. 6 illustrates one example of the adaptive speed control executed by the ICC unit 10 in step S400. In this example, the host vehicle V initially travels along a roadway segment for which the posted speed limit is set to 25 mph, and then proceeds to a roadway segment for which the posted speed limit is increased to 35 mph. The transition point of the posted speed limit from 25 mph to 35 mph is set to a location where a speed sign S indicating 35 mph speed limit is placed. In FIG. 6, assume, before the host vehicle V reaches the point P1, the driver has activated the adaptive speed control mode and set the desired cruising speed to 25 mph by operating the input operators 63 or the adaptive speed control of the first embodiment was previously performed to adjust the set speed of the host vehicle V to the current posted speed limit of 25 mph. In such a situation, in point P1, the speed limit display region 43*a* on the display screen 43 shows the current speed limit of 25 mph and the set speed indicator region 61*c* of the ICC indicator 61 shows the current set speed of 25 mph. When the host vehicle V proceeds along the roadway and reaches point P2, the estimated time of arrival to the transition point (the speed limit sign S) becomes equal to or less than the prescribed period (e.g., 7 to 9 seconds). Therefore, the ICC unit 10 determines that the prescribed notification timing arrived, and controls the ICC indicator 61 and the buzzer 62 to notify the user of the upcoming change to the posted speed limit. More specifically, the buzzer 62 makes a beeping sound and the ICC indicator 61 displays flashing digits (i.e., "35") corresponding to the new posted speed limit. When the driver operates the one-touch button 63*a* at point P3 in response to those notifications, the set speed signal is sent to the ICC unit 10. Therefore, the ICC unit 10 controls the engine control unit 30 to accelerate the host vehicle V so that the speed of the host vehicle reaches the new posted speed limit, i.e., 35 mph. In other words, activation of the one-touch button 63*a* after the notification timing causes the vehicle speed of the host vehicle V to be adapted to the new posted speed limit. Once the host vehicle V reaches the transition point, the flashing display in the set speed indicator region 61*c* of the ICC indicator 61 is changed to the steady display of the new posted speed, i.e., 35 mph. Alternatively, the flashing display may be continued until the speed of the host vehicle V reaches the current posted speed limit. Accordingly, with the adaptive speed control executed by the ICC unit 10 in step S400 of FIG. 3, the driver is notified of the upcoming change to the posted speed limit, and the speed of the host vehicle V is automatically adjusted to the new speed limit simply by pressing the one-touch button 63*a*.

Figure 7:
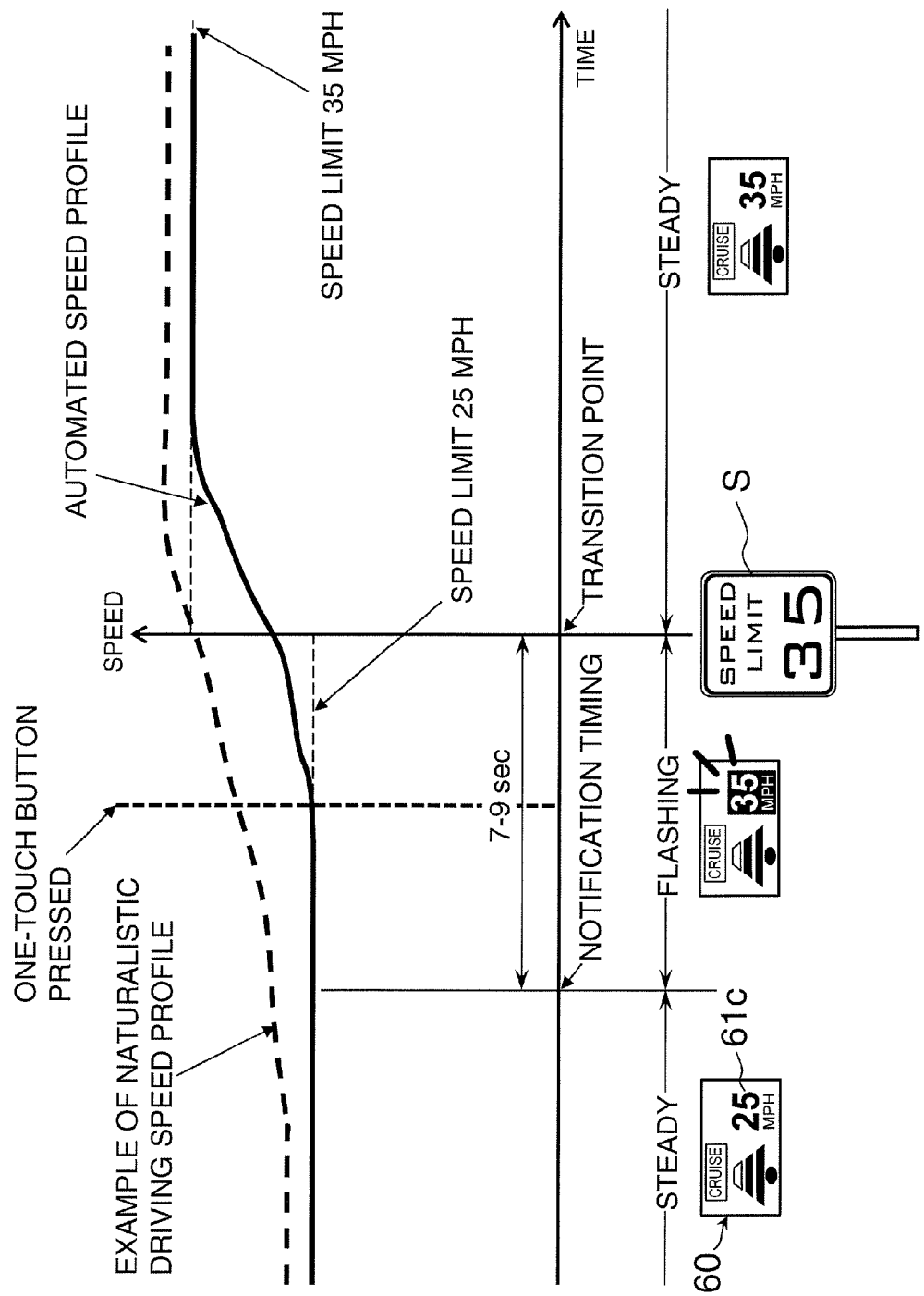
FIG. 7 is a characteristics diagram showing the relationship between vehicle speed and time when the posted speed limit changes and when the adaptive speed control is executed according to the first embodiment.

When the speed of the host vehicle V is automatically controlled in step S400, the ICC unit 10 is configured to perform the speed control so that the acceleration/deceleration of the host vehicle V does not cause an unnatural feeling to the driver. FIG. 7 is a characteristic diagram illustrating change in the vehicle speed (shown in the solid line) when the adaptive speed control is executed in the situation illustrated in FIG. 6. FIG. 7 also shows change in the vehicle speed according to one example of naturalistic (manual) driving profile shown in the dotted line. As shown in FIG. 7, upon activation of the one-touch button 63*a*, the ICC unit 10 controls the engine control unit 30 so that the host vehicle V starts accelerating toward the new posted speed limit (i.e., 35 mph). The ICC unit 10 is configured to control the vehicle speed so that the vehicle speed gradually increases in a similar manner as the naturalistic driving profile. In other words, the host vehicle V accelerates and the vehicle speed reaches the new posted speed limit (i.e., 35 mph) over a period of time that generally corresponds to the period of time required for the naturalistic driving profile to increase the vehicle speed to the new posted speed limit. Accordingly, the vehicle speed of the host vehicle V is changed to the new posted speed limit in naturalistic manner according to the first embodiment. The naturalistic driving speed profile and the automated speed profile shown in FIG. 7 are merely examples to explain how the vehicle speed is automatically changed during the adaptive speed control in relation to the naturalistic driving speed profile. It will be apparent to those skilled in the art from this disclosure that the ICC unit 10 can be configured to execute appropriate programs to perform the automatic speed control of the host vehicle V in naturalistic manner. For example, a reference naturalistic driving speed profile can be determined using various methods (e.g., by performing experiments in advance, by simulation, by monitoring the driver's historical driving profile, etc.), and the ICC unit 10 can be configured to perform the automatic speed control in naturalistic manner according to the reference naturalistic driving speed profile. Also, the ICC unit 10 can be configured to adjust the timing at which the host vehicle V starts accelerating/decelerating after activation of the one-touch button 63*a* and the timing at which the vehicle speed reaches the new posted speed to achieve the automatic adjustment of the vehicle speed in naturalistic manner.

Second Embodiment

Referring now to FIG. 8, an adaptive speed control device in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts and control process of the second embodiment that are identical to the parts and control process of the first embodiment may be omitted for the sake of brevity.

The adaptive speed control device of the second embodiment is identical to the adaptive speed control device of the first embodiment except for the control processing executed by the ICC unit 10. Thus, the overall structure of the adaptive speed control device of the second embodiment is the same as the overall structure illustrated in FIG. 1.

FIG. 8 is a flowchart illustrating a main routine for the adaptive speed control processing executed by the ICC unit 10 in accordance with the second embodiment. The flowchart of FIG. 8 describes one example of the main routine algorithm for the adaptive speed control process. The only difference between the first and second embodiments is that the control processing in step S55 is inserted between steps S50 and S60 as shown in FIG. 8. The subroutine for the second embodiment is the same as the subroutine illustrated in FIG. 4.

More specifically, in the second embodiment, the ICC unit 10 is configured to set a prescribed activation timing at which the new posted speed mode is set to cause the vehicle speed of the host vehicle V to adopt the new posted speed limit upon operation of the one-touch button 63*a*. In the first embodiment illustrated in FIG. 3, the ICC unit 10 sets the new posted speed mode simultaneously with the notification timing in step S60 (i.e., the prescribed activation timing occurs simultaneously with the prescribed notification timing in the first embodiment). On the other hand, in the second embodiment, the prescribed activation timing is set to occur after the prescribed notification timing. For example, if the prescribed notification timing is set to 9 seconds before the host vehicle V reaches the transition point, the prescribed activation timing may be set to 7 seconds before the host vehicle V reaches the transition point.

Thus, in the second embodiment as shown in FIG. 8, after the driver is notified of the upcoming change to the posted speed limit in step S50, the ICC unit 10 is configured to determine whether it reached the prescribed activation timing in step S55. In this embodiment, the prescribed activation timing is preferably defined as a prescribed period (e.g., 5 to 7 seconds) before the host vehicle V reaches the transition point. The ICC unit 10 can determine whether it reached the activation timing by using the same method for determining the notification timing in step S40 as described above. The ICC unit 10 is configured to repeat the processing in step S55 at a prescribed interval until it reaches the prescribed activation timing. Once it reaches the prescribed activation timing in step S55, the process proceeds to step S60 in which the ICC unit 10 sets the new posted speed mode as described above.

Accordingly, with the second embodiment, there is a time delay between when the driver is notified of the upcoming change to the posted speed limit and when the new posted speed mode is set, in which operation of the one-touch button 63*a* by the driver results in the vehicle speed being automatically changed to the new posted speed detected in step S10.

The notification to the driver in the second embodiment may be modified such that the ICC unit 10 controls the buzzer 62 to provide an audio output at the notification timing, and controls the ICC indicator 61 to display flashing digits corresponding to the new posted speed limit at the activation timing. In this way, the driver can be notified of the upcoming change to the posted speed limit at the notification timing. Then, the driver can easily recognize when the new posted speed mode is set to cause the vehicle speed to adopt the new posted speed by the flashing display of the ICC indicator 61 at and after the activation timing.

In the illustrated embodiments as described above, the adaptive speed control is performed to automatically adapt the vehicle speed to the posted speed limit when requested by the driver. However, the ICC unit 10 can be configured to automatically adjust the vehicle speed by taking into consideration a user defined margin, which can be set by the user in advance. For example, when the user prefers to always drive 2 mph under the posted speed limit, the ICC unit 10 can be configured to accept the user input for the user defined margin in advance, and to automatically adapt the vehicle speed to a speed that is 2 mph under the posted speed limit when the driver activates the one-touch button 63*a*.

In the illustrated embodiments as described above, the one-touch button 63*a* is mounted on the steering wheel of the host vehicle V. However, the one-touch button 63*a* can be mounted in various locations other than the steering wheel, such as the instrument panel, as long as the one-touch button 63*a* can be easily accessed by the driver while driving. Moreover, the system may be configured and arranged to provide a virtual button on the display screen 43 by displaying an icon showing the current set speed limit and another icon showing the new speed limit, and the ICC unit 10 may be configured to execute the adaptive speed control as explained above when the driver touches the icon showing the new speed limit on the display screen 43.

In the illustrated embodiments as described above, the one-touch button 63a is also used as the input operator for setting the cruising speed, accelerating or decelerating the vehicle speed, and/or resuming the previously set cruising speed for the cruise control system. However, a one-touch button dedicated to the adaptive speed control of the illustrated embodiments may be provided separately from the input operator for the cruise control system. Moreover, the one-touch button dedicated to the adaptive speed control may be eliminated and replaced with a semi-automatic function that can be enabled or disabled by the driver when the cruise control system is activated.

In the illustrated embodiments as described above, the ICC indicator 61 is provided in the instrument panel. However, the ICC indicator 61 can be placed in various locations as long as the ICC indicator 61 is easily seen by the driver while driving. In the illustrated embodiments, the ICC indicator 61 normally displays the set cruising speed for the cruise control system, and the ICC indicator 61 is used to notify the new posted speed at the notification timing for executing the adaptive speed control. However, an indicator dedicated to the adaptive speed control of the illustrated embodiments may be provided separately from the ICC indicator 61. In such a case, the adaptive speed control indicator preferably includes a set speed indicator region that at least displays the new posted speed limit at the notification timing. The adaptive speed control indicator may be placed in various locations as long as it is easily seen by the driver while driving. Also, the adaptive speed control indicator may be displayed on the display screen 43.

In the illustrated embodiments, the example in which the notification timing is set to 7 to 9 seconds before the host vehicle V reaches the transition point is explained. However, the notification timing and the activation timing can be set to appropriate values as necessary or desired. Moreover, the notification timing and the activation timing may be set to variable values depending on values of the posted speed limits, road types, etc., to adapt various driving conditions. For example, the notification timing may be set to an earlier timing when the current posted speed limit is higher than the new posted speed limit (when the vehicle is required to decelerate) or when the difference between the current posted speed limit and the new posted speed limit is large so that there will be sufficient time for decelerating/accelerating the host vehicle V.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An adaptive speed control device for a host vehicle comprising:
    a speed detecting section configured to detect a current speed of the host vehicle, a current posted speed limit, a new posted speed limit, and a transition point along a host vehicle's expected path corresponding to the new posted speed limit;
    a notification section configured to automatically select the new posted speed limit as a selected speed and provide a notification of the new posted speed limit during a prescribed notification timing before the host vehicle reaches the transition point;
    a user input device; and
    an adaptive speed control section configured to automatically change a speed of the host vehicle from the current speed to the selected speed upon receiving an input from the user input device during a prescribed activation timing before reaching the transition point, the prescribed activation timing occurring simultaneously with the prescribed notification timing authorizing the adaptive speed control section to change the speed of the host vehicle to the selected speed and after delaying changing the speed of the host vehicle to the selected speed until the host vehicle reaches the transition point.

2. The adaptive speed control device according to claim 1, wherein
    the prescribed notification timing is between 7 and 9 seconds before the host vehicle reaches the transition point.

3. The adaptive speed control device according to claim 1, wherein
    the prescribed activation timing is equal to the prescribed notification timing.

4. The adaptive speed control device according to claim 1, wherein
    the prescribed activation timing is less than the prescribed notification timing.

5. The adaptive speed control device according to claim 1, wherein the adaptive speed control section is further configured to change the speed of the host vehicle to a different speed in accordance with the current posted speed limit upon receiving the input from the user input device prior to the prescribed activation timing.

6. The adaptive speed control device according to claim 1, wherein
the speed detecting section is configured to detect the current posted speed limit, the new speed limit, and the transition point by referring to a map database containing information corresponding to posted speed limits for roadway segments and transition points of the posted speed limits.

7. The adaptive speed control device according to claim 1, wherein
the notification section is configured to provide at least one of a visual output and an audio output indicative of the new posted speed limit as the notification.

8. A vehicle comprising:
a user interface device including a user input device;
a vehicle speed controller configured and arranged to automatically control a speed of the vehicle; and
an adaptive speed control device operatively coupled to the user interface device and the vehicle speed controller, the adaptive speed control device including:
an adaptive speed control section configured to maintain a current speed of the vehicle;
a speed detecting section configured to detect the current speed of the vehicle, a current posted speed limit, a new posted speed limit, and a transition point along an expected path corresponding to the new posted speed limit while the adaptive speed control section is maintaining the current speed of the vehicle; and
a notification section configured to automatically select the new posted speed limit as a selected speed and provide a notification of the new posted speed limit during a prescribed notification timing before the vehicle reaches the transition point while the adaptive speed control section is maintaining the current speed of the vehicle;
the adaptive speed control section being further configured to maintain the current speed in the absence of an input from the user input device authorizing a change in vehicle speed, and to automatically change the speed of the vehicle from the current speed to the selected speed upon receiving an input from the user input device during a prescribed activation timing before reaching the transition point, the prescribed activation timing occurring simultaneously with the prescribed notification timing authorizing the adaptive speed control section to change the speed of the vehicle to the selected speed.

9. The vehicle according to claim 8, wherein
the prescribed notification timing is between 7 and 9 seconds before the vehicle reaches the transition point.

10. The vehicle according to claim 8, wherein
the prescribed activation timing is equal to the prescribed notification timing.

11. The vehicle according to claim 8, wherein
the prescribed activation timing is less than the prescribed notification timing.

12. The vehicle according to claim 8, wherein
the adaptive speed control section of the adaptive speed control device is further configured to change the speed of the vehicle to a different speed in accordance with the current posted speed limit upon receiving the input from the user input device prior to the prescribed activation timing.

13. The vehicle according to claim 8, wherein
the adaptive speed control section of the adaptive speed control device is configured to delay changing the speed of the vehicle to the selected speed until after the vehicle reaches the transition point.

14. The vehicle according to claim 8, wherein
the user interface device includes at least one of a visual output section and an audio output section, and
the notification section of the adaptive speed control device is configured to control the user interface device to at least one of display the new posted speed limit in the visual output section and control the audio output section to provide an audio output indicative of the new posted speed limit as the notification.

15. The vehicle according to claim 8, wherein
the user interface device includes at least one of a visual output section and an audio output section, and
the user interface device is configured and arranged to at least one of display the current posted speed limit in the visual output section and control the audio output section to provide an audio output indicative of the current posted speed limit prior to the prescribed notification timing.

16. The vehicle according to claim 8, wherein
the user input device of the user interface device is configured and arranged to send the input to the adaptive speed control section upon a single touch of the user input device by the user.

17. The vehicle according to claim 8, wherein
the user input device of the user interface device is disposed on a steering wheel.

18. A method of adaptively controlling the speed of a host vehicle, the method comprising
detecting a current speed limit;
detecting a new speed limit;
detecting a transition point from the current speed limit to the new speed limit;
determining a notification timing based on a notification distance from the transition point;
automatically selecting the new posted speed limit as a selected speed;
providing a notification of the selected speed during the notification timing upon the host vehicle reaching the notification distance;
receiving an input from a user input device during the notification timing;
upon receiving the input during the notification timing that authorizes a change in the speed of the host vehicle to the selected speed, delaying changing the speed of the host vehicle to the selected speed until the host vehicle reaches the transition point;
automatically changing the speed of the host vehicle from a current speed to the selected speed upon receiving the input during the notification timing that authorizes a change in the speed of the host vehicle to the selected speed and after delaying changing the speed of the host vehicle to the selected speed until the host vehicle reaches the transition point;
determining an activation timing based on an activation distance from the transition point, with the activation timing being simultaneous with the notification timing; and changing the speed of the host vehicle from the current speed to the selected speed only upon receiving the input during the activation timing.

19. The method according to claim 18, wherein the activation timing is equal to the notification timing.

20. The method according to claim 18, wherein the activation timing is less than the notification timing, with the activation distance located between the notification distance and the transition point.

21. The method according to claim 18, further comprising changing the speed of the host vehicle from the current speed to a different speed in accordance with the current speed limit upon receiving an input prior to the activation timing.

22. The method according to claim 18, further comprising changing the speed of the host vehicle from the current speed to a different speed in accordance with the current speed limit upon receiving an input prior to the notification timing.

* * * * *